(12) United States Patent
Zhou et al.

(10) Patent No.: US 9,343,958 B2
(45) Date of Patent: May 17, 2016

(54) VOLTAGE REGULATOR DEVICES AND VOLTAGE REGULATING METHOD

(71) Applicant: Semiconductor Manufacturing International Corp., Shanghai (CN)

(72) Inventors: Shicong Zhou, Shanghai (CN); Edward Yu, Shanghai (CN); Xiao Zheng, Shanghai (CN); Josh Yang, Shanghai (CN); Michael Yang, Shanghai (CN)

(73) Assignee: SEMICONDUCTOR MANUFACTURING INTERNATIONAL CORP, Shanghai (CN)

(*) Notice: Subject to any disclaimer, the term of this patent is extended or adjusted under 35 U.S.C. 154(b) by 317 days.

(21) Appl. No.: 13/896,567

(22) Filed: May 17, 2013

(65) Prior Publication Data

US 2013/0342180 A1 Dec. 26, 2013

(30) Foreign Application Priority Data

Jun. 26, 2012 (CN) .......................... 2012 1 0214292

(51) Int. Cl.
*G05F 1/153* (2006.01)
*H02M 3/156* (2006.01)
*H02M 3/07* (2006.01)

(52) U.S. Cl.
CPC ..................................... *H02M 3/07* (2013.01)

(58) Field of Classification Search
CPC .......... G01R 19/0084; G05F 1/59; G05F 1/62; G05F 3/30; G05F 3/247; H02M 3/156; H02M 3/1588
USPC .................................... 323/234, 269, 282, 313
See application file for complete search history.

(56) References Cited

U.S. PATENT DOCUMENTS 7,403,405 B2 * 7/2008 Conte et al. ...................... 363/59
8,120,412 B2 * 2/2012 Pelley ............................ 327/536
2011/0032026 A1 2/2011 Pelley et al.

* cited by examiner

*Primary Examiner* — Yemane Mehari
(74) *Attorney, Agent, or Firm* — Anova Law Group, PLLC

(57) ABSTRACT

Various embodiments provide voltage regulator circuitry and devices. An exemplary voltage regulator circuitry can include a current comparing unit configured to convert an output voltage from a charge pump to a current and to compare the current with at least two different reference currents to generate a comparison result. A logic controller can be configured to generate a clock frequency adjustment signal based on the comparison result. A programmable clock unit can be configured to adjust a frequency of a clock signal according to the clock frequency adjustment signal to send the clock signal to the charge pump. Accordingly, the disclosed voltage regulator device can have reduced power consumption and improved reliability.

18 Claims, 4 Drawing Sheets

VOLTAGE REGULATOR DEVICES AND VOLTAGE REGULATING METHOD

CROSS-REFERENCES TO RELATED APPLICATIONS

This application claims priority to Chinese Patent Application No. CN201210214292.x, filed on Jun. 26, 2012, the entire contents of which are incorporated herein by reference.

FIELD OF THE DISCLOSURE

The present disclosure relates to the field of integrated circuit (IC) technology and, more particularly, relates to a voltage regulator circuitry and device.

BACKGROUND

In an electrically erasable programmable read-only memory (EEPROM), an accurate high voltage is required for erase/write cycles. Conventional approaches use a charge pump to raise voltage, which is in combination with a clamping diode. For example, in FIG. 1, a charge pump 10, driven by a clock signal (CLK), may provide a high voltage used to drive a load device 20. In order to ensure that the output voltage of the charge pump 10 is in a safe state, a clamping diode D0 is configured in parallel at the output terminal of the charge pump 10. Due to the reverse breakdown current-voltage characteristics of the clamping diode D0, any excess current can be drained through the clamping diode D0. The high voltage may then be maintained within a certain range.

As shown in FIG. 1, a current flowing through the clamping diode D0 is $I_D$, and a current flowing through the load device 20 is $I_L$. The total output current of the charge pump 10 is $I_{out}=I_D+I_L$. The power consumed by the clamping diode D0 is $P_D=V_{out} \times I_D$; and the total output power of the charge pump 10 is $P_{out}=V_{out} \times I_{out}=V_{out} \times (I_D+I_L)$, where $V_{out}$ denotes output voltage of the charge pump 10.

Further, in practical applications, a total output current $I_{out}$ of the charge pump 10 is often designed to be $I_{Lmax}+I_D$, where $I_{Lmax}$ is a maximum load current flowing through the load device 20. The clock signal of the charge pump 10 typically has a relatively high frequency. Since both the power $P_{out}$ consumed by the charge pump 10 and the power $P_D$ consumed by the clamping diode D0 are proportional to the frequency of the clock signal of the charge pump 10, the clamping diode D0 consumes a large amount of power. The circuit in FIG. 1 therefore has undesired high power consumption.

In addition, because the clamping diode D0 is operated under high voltages and high powers, the clamping diode D0 may gradually age over time of usage. Consequently, voltage across the clamping diode D0 may be gradually increased, which eventually leads to increase of the output voltage $V_{out}$ of the charge pump 10. Reliability of erase/write in EEPROM is reduced.

Thus, there is a need to overcome these and other problems and to provide a voltage regulator circuitry and method to reduce power consumption and to increase reliability of EEPROMs.

BRIEF SUMMARY OF THE DISCLOSURE

According to various embodiments, there is provided a voltage regulator circuitry. The voltage regulator circuitry can include a current comparing unit, a logic controller, and a programmable clock unit. The current comparing unit can be configured to convert an output voltage from a charge pump to a current and to compare the current with at least two different reference currents to generate a comparison result. The logic controller can be connected to the current comparing unit and configured to generate a clock frequency adjustment signal based on the comparison result. The programmable clock unit can be connected to the logic controller and configured to adjust a frequency of a clock signal according to the clock frequency adjustment signal and send the clock signal to the charge pump.

According to various embodiments, there is also provided a method of configuring a voltage regulator circuitry. A current comparing unit can be connected to a logic controller to convert an output voltage from a charge pump to a current and to compare the current with at least two different reference currents to generate a comparison result. The logic controller can be connected to a programmable clock unit. The logic controller can receive the comparison result from the current comparing unit and generate a clock frequency adjustment signal for the programmable clock unit to adjust a frequency of a clock signal and send the clock signal to the charge pump.

According to various embodiments, there is further provided a method for regulating a voltage by first converting an output voltage from a charge pump to a current. The current can be compared with at least two different reference currents to generate a comparison result by a current comparing unit. A clock frequency adjustment signal can then be generated by a logic controller based on the comparison result from the current comparing unit. A frequency of a clock signal can be adjusted by a programmable clock unit according to the clock frequency adjustment signal. The clock signal can then be sent to the charge pump.

Other aspects or embodiments of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Charge pumps often have large power consumption, low reliability, and thermal drifts. Methods for solving such problems may include a voltage regulator using a Zener diode. This voltage regulator receives drive voltage from a charge pump and controls the drive voltage level by regulating the drive voltage. The voltage regulator includes a current comparator, as shown in FIG. 2.

Figure 1:
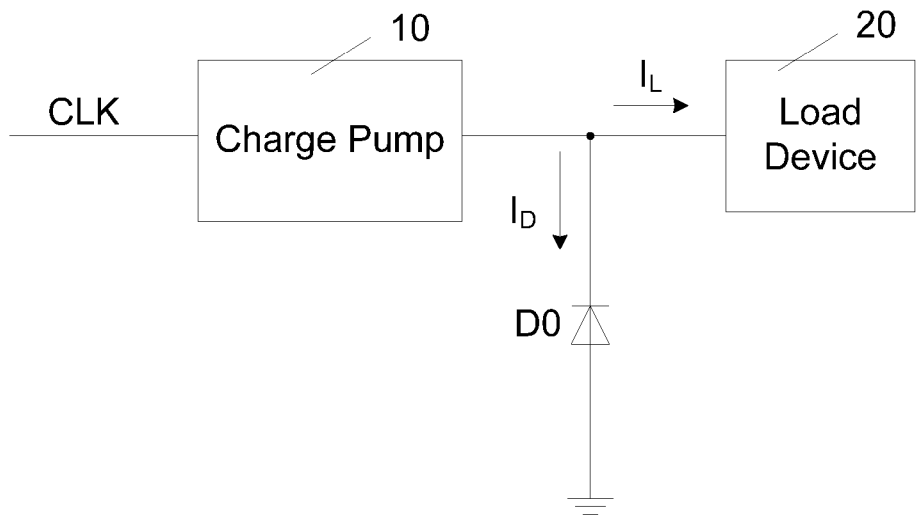
FIG. 1 depicts a conventional charge pump.
Figure 2:
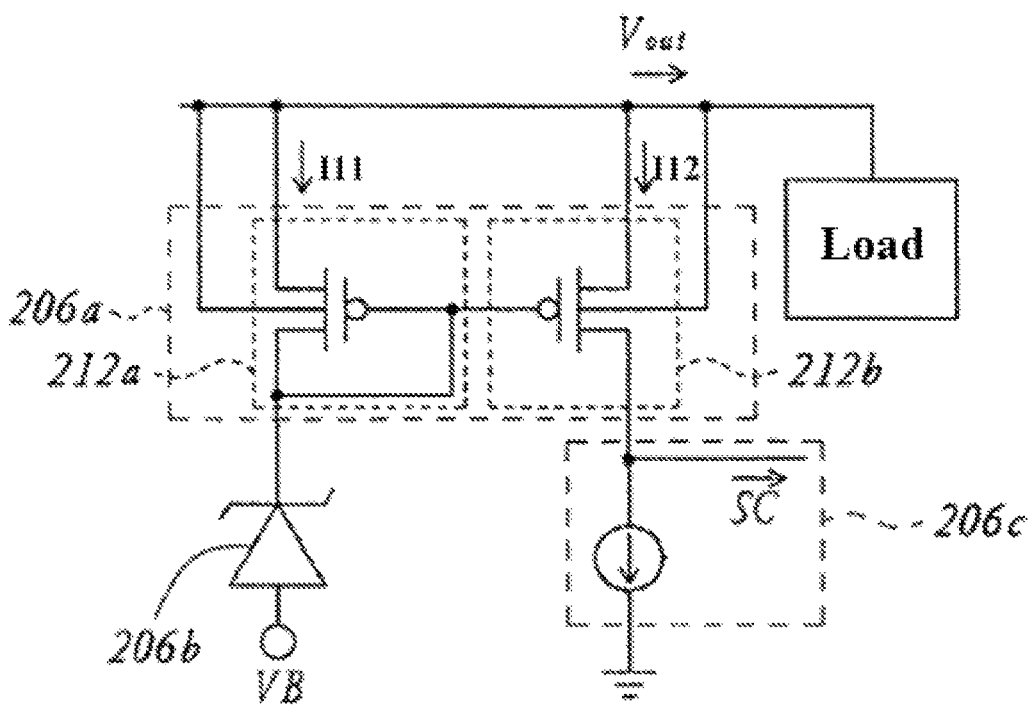
FIG. 2 depicts a conventional current comparing unit using Zener diode.

In FIG. 2, the current comparator includes a current mirroring unit 206a, a Zener diode 206b, and a bias-voltage unit 206c. The current mirroring unit 206a has a primary current terminal 212a and a secondary current terminal 212b. The current mirroring unit 206a receives an output voltage $V_{out}$ and outputs the $V_{out}$ as a drive voltage to respectively generate a first current signal 111 and a second current signal 112 at the primary current terminal 212a and the secondary current terminal 212b, according to the drive voltage. The negative terminal of the Zener diode 206b is electrically connected to the primary current terminal 212a, and the positive terminal of the Zener diode 206b is biased by a fixed voltage VB. The Zener diode 206b receives the first current signal 111, and maintains the output voltage $V_{out}$ at a predetermined voltage level. The bias-voltage unit 206c receives the second current signal 112; determines whether the level of the output voltage $V_{out}$ reaches the predetermined voltage level according to the second current signal 112; and outputs a control signal SC. The control signal SC is fed back to the charge pump to control the charge pump to generate the drive voltage. However, because only one decision node (i.e., whether the output voltage is equal to the predetermined voltage) is used, frequency of the clock signal of the charge pump may fluctuate, thereby affecting the voltage regulation of the output voltage of the charge pump.

This is because there is a certain delay between frequency change of the clock signal and control of output voltage of the charge pump. That is, an increase in the frequency of the clock signal does not immediately increase the output voltage of the charge pump to the predetermined voltage, but needs a period of time to slowly increase the output voltage. However, during this slow increase, the output voltage is still less than the predetermined voltage, which in turn requires increase of the frequency of the clock signal after the feedback. Thus, the frequency of the clock signal is continuously increased to cause the output voltage to be greater than the predetermined voltage. Then, after a certain period of time (i.e., when the output voltage is greater than the predetermined voltage), the frequency of the clock signal needs to be reduced based on the predetermined voltage.

Likewise, in a process of reducing the frequency of the clock signal, a delay between frequency change and the control of output voltage may occur. This causes the frequency of the clock signal to be continuously reduced, thereby causing the output voltage of the charge pump to continuously fluctuate.

Figure 3:
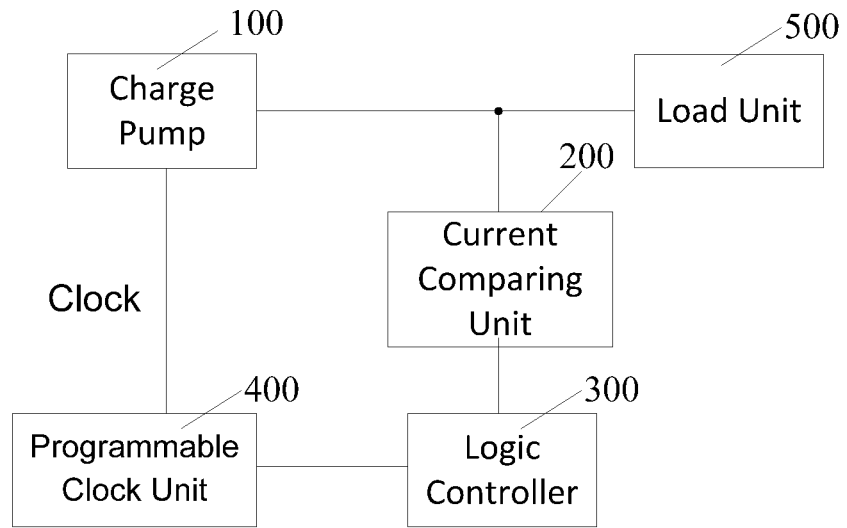
FIG. 3 depicts an exemplary voltage regulator device in accordance with various disclosed embodiments.

FIG. 3 depicts an exemplary voltage regulator device in accordance with various disclosed embodiments. The voltage regulator device in FIG. 3 may include a charge pump 100 and a voltage regulator circuitry. The voltage regulator circuitry can include a current comparing unit 200, a logic controller 300, and a programmable clock unit 400. The charge pump 100 can be used to raise voltage under control of a clock signal (Clock), and to output a high voltage level to drive a load unit 500.

The current comparing unit 200 (e.g., a current sensor) can be configured to detect an output voltage of the charge pump 100. Further the current comparing unit 200 converts the output voltage into a current and compares the current with at least two different reference currents to generate a comparison result. In one example, the current can be in a small amount, e.g., ranging from about 0.3 mA to about 1 mA.

The logic controller 300 can be configured to receive the comparison result from the current comparing unit 200, and to generate a clock frequency adjustment signal based on the comparison result. In one embodiment, the logic controller 300 can be connected to a digital interface, etc.

The programmable clock unit 400 (e.g., a clock generator) can be configured to adjust the frequency of the clock signal (Clock) according to the frequency adjustment signal received from the logic controller 300. The clock signal (Clock) can be sent to the charge pump 100 to control operations of the charge pump 100.

The current comparing unit 200, the logic controller 300, and the programmable clock unit 400 can form a feedback loop. The frequency of the clock signal (Clock) can be adjusted according to the feedback loop such that the charge pump 100 can be operated in an optimal condition to effectively reduce power consumption of the circuit.

Figure 4:
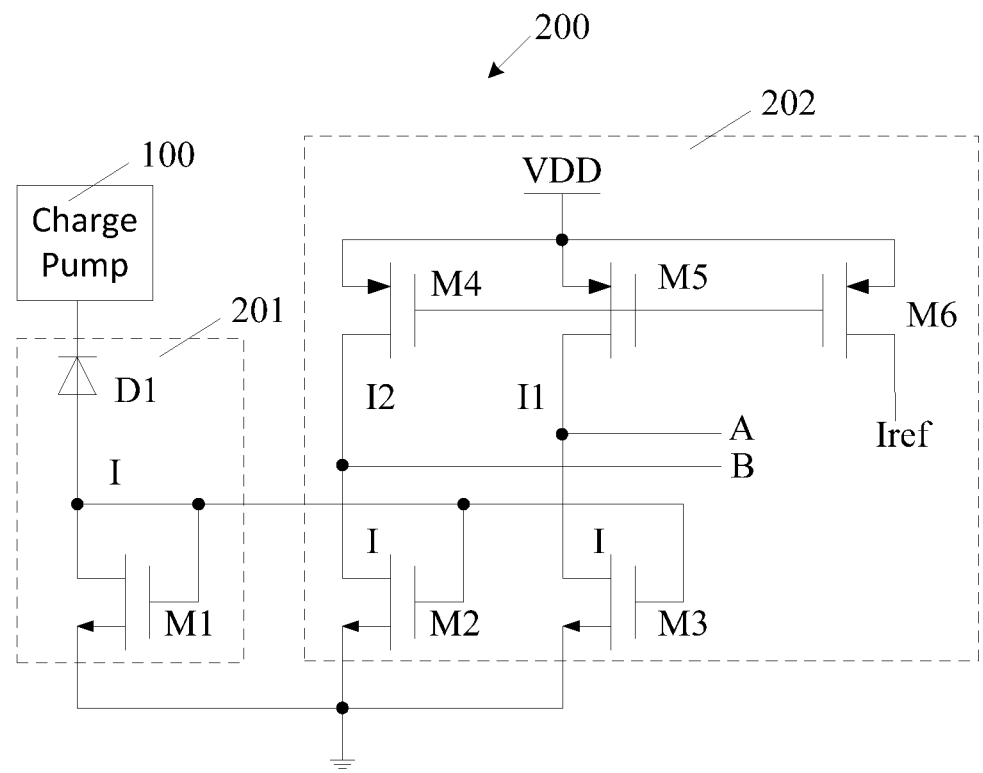
FIG. 4 depicts an exemplary current comparing unit used in an exemplary voltage regulator device in accordance with various disclosed embodiments.

FIG. 4 depicts an exemplary current comparing unit in accordance with various disclosed embodiments. As shown in FIG. 4, the current comparing unit 200 can include, e.g., a current obtaining unit 201 and a comparing unit 202.

The current obtaining unit 201 can include a first diode D1 and a first MOS transistor M1. A negative terminal of the first diode D1 can be connected to the output terminal of the charge pump 100, and a positive terminal of the first diode D1 can be connected to a drain of the first MOS transistor M1. A source of the first MOS transistor M1 can be electrically grounded (e.g., electrically connected to a ground terminal). The gate and the drain of the first MOS transistor M1 can be connected with one another. The drain of the first MOS transistor M1 can serve as an output terminal of the current obtaining unit 201.

The comparing unit 202 can include, for example, a second MOS transistor M2, a third MOS transistor M3, a fourth MOS transistor M4, a fifth MOS transistor M5, and a sixth MOS transistor M6.

Sources of the second MOS transistor M2 and the third MOS transistor M3 can be electrically grounded. Gates of the second MOS transistor M2 and the third MOS transistor M3 can be connected to the drain of the first MOS transistor M1. A drain of the second MOS transistor M2 can be connected to a drain of the fourth MOS transistor M4. A drain of the third MOS transistor M3 can be connected to a drain of the fifth MOS transistor M5. Sources of the fourth MOS transistor M4, the fifth MOS transistor M5, and sixth MOS transistor M6 can be connected to a power supply (VDD). Gates of the fourth MOS transistor M4 and the fifth MOS transistor M5 can be connected to a gate of the sixth MOS transistor M6. A drain of the sixth MOS transistor M6 can receive a reference current $I_{ref}$ as shown in FIG. 4.

The fifth MOS transistor M5 and the third MOS transistor M3 can form a first comparing branch. The fourth MOS transistor M4 and the second MOS transistor M2 can form a second comparing branch. Specifically, the drain of the fifth MOS transistor M5 can be used as a first output terminal A of the comparing unit 202 to output a first signal. The drain of the fourth MOS transistor M4 can be used as a second output terminal B of the comparing unit 202 to output a second signal. The comparison result provided by the current comparing unit 200 can include the first signal and the second signal. Further, in one embodiment, the fourth MOS transistor M4 can have an aspect ratio (i.e., a ratio of width to length) greater than the fifth MOS transistor M5. The second MOS transistor M2 can have an aspect ratio equal to the third MOS transistor M3.

In one embodiment, the first diode D1 can be a clamping diode, and can be used to control the output voltage of the charge pump 100 within a certain range. As shown in FIG. 4, the sixth MOS transistor M6 has a drain configured to receive the reference current $I_{ref}$ including: a first reference current I1 including a drain current of the fifth MOS transistor, and a second reference current I2 including a drain current of the fourth MOS transistor.

Figure 5:
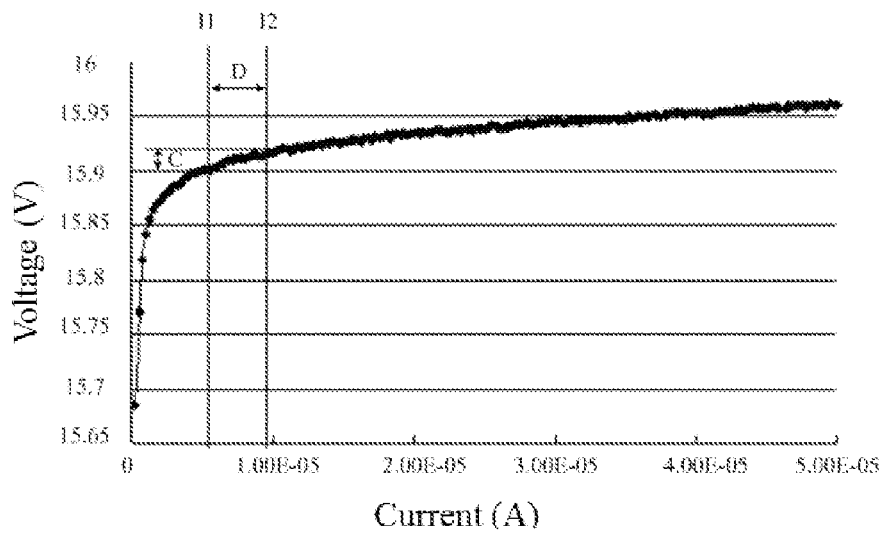
FIG. 5 depicts voltage-current characteristics of an exemplary first diode in FIG. 4 in accordance with various disclosed embodiments.

FIG. 5 depicts the voltage-current characteristics of the first diode D1. In FIG. 5, the x-axis represents current of the first diode D1 and the y-axis represents voltage of the first diode D1. The voltage of the first diode D1 varies as current varies, and voltages corresponding to different currents may be largely different. This can adversely affect stability of the voltage output provided by the charge pump 100. In order to reduce drifts of the output voltage of the charge pump 100, as disclosed herein, two reference currents are used, including, e.g., a first reference current I1 and a second reference current I2 as shown in FIG. 5. Comparison between current I and the two reference currents I1 and I2 can be used to determine if the output voltage of the charge pump needs to be adjusted such that the output voltage is maintained in a predetermined range.

The reference current $I_{ref}$, the first reference current I1, and the second reference current I2 can be arranged in any manner as desired. For example, if a predetermined range of the output voltage of the charge pump 100 is maintained within a range C as indicated in FIG. 5, corresponding current I can fall on a current point in a range D as indicated in FIG. 5. The endpoints of the range D can be used to determine the first reference current I1 and the second reference current I2. For example, the first reference current I1 can be a current at the left endpoint of the range D (i.e., with smaller current value), while the second reference current I2 can be a current at the right endpoint of the range D, as shown in FIG. 5.

If the current I is less than the first reference current I1, indicating that the output voltage of the charge pump 100 is less than the predetermined range, the frequency of the clock signal (Clock) can be increased such that the charge pump 100 can continue to raise the output voltage.

If the current I is greater than or equal to the first reference current I1 and less than or equal to the second reference current I2, indicating that the output voltage of the charge pump 100 is within the predetermined range C, there is no need to adjust the frequency of the clock signal (Clock). Stability of the output voltage of the charge pump 100 can be achieved by maintaining this frequency and the output voltage can be maintained in the predetermined range C.

If the current I is greater than the second reference current I2, indicating that the output voltage of the charge pump 100 is greater than the predetermined range C, the frequency of the clock signal (Clock) can be reduced to gradually reduce output voltage of the charge pump 100.

Specifically, referring back to FIG. 4, the first MOS transistor M1, the second MOS transistor M2, and the third MOS transistor M3 can form a current mirroring structure. Therefore, the drain current I of the first MOS transistor M1 can be mirrored to the drain of the second MOS transistor M2 and the drain of the third MOS transistor M3. Since the aspect ratio of the fourth MOS transistor M4 is greater than that of the fifth MOS transistor M5, the drain currents of the fourth MOS transistor M4 and the fifth MOS transistor M5 can be different. That is, the first reference current I1 can be generated from the drain of the fifth MOS transistor M5, and the second reference current I2 can be generated from the drain of the fourth MOS transistor M4.

Further, in one embodiment, the first MOS transistor M1, the second MOS transistor M2, and the third MOS transistor M3 can be N-type MOS (NMOS) transistors, and the fourth MOS transistor M4, the fifth MOS transistor M5, and the sixth MOS transistor M6 can be P-type MOS (PMOS) transistors. Alternatively, the first MOS transistor M1, the second MOS transistor M2, and the third MOS transistor M3 can be PMOS transistors, and the fourth MOS transistor M4, the fifth MOS transistor M5, and the sixth MOS transistor M6 can be NMOS transistors. Of course, types and connection structures of one or more transistors selected from M1-M6 can be varied with desired functionality.

TABLE 1

| Current (μA) | A | B | Increase frequency | Decrease frequency |
|---|---|---|---|---|
| I < I1 | 1 | 1 | 1 | 0 |
| I1 ≤ I ≤ I2 | 0 | 1 | 0 | 0 |
| I > I2 | 0 | 0 | 0 | 1 |

Referring back to FIGS. 3-5 and as further depicted in Table 1, when the output current I of the current obtaining unit 201 is less than the first reference current I1, the first signal from the first output terminal A of the comparing unit 202 can be at a high level "1", and the second signal from the second output terminal B of the comparing unit 202 can also be at a high level "1". The comparison result in this case can thus be "11". Based on this comparison result, the logic controller 300 can generate a first clock frequency adjustment signal (not shown). Based on the first clock frequency adjustment signal, the programmable clock unit 400 can increase the frequency of the clock signal (Clock).

When the current I is greater than or equal to the first reference current I1 and is less than or equal to the second reference current I2, the first signal from the first output terminal A of the comparing unit 202 can be at a low level "0", and the second signal from the second output terminal B of the comparing unit 202 can be at a high level "1". The comparison result in this case can thus be "01". Based on this comparison result, the logic controller 300 can generate a second clock frequency adjustment signal. Based on the second clock frequency adjustment signal, the programmable clock unit 400 can maintain the frequency of the clock signal (Clock) to stay unchanged.

When the current I is greater than the second reference current I2, the first signal from the first output terminal A of the comparing unit 202 can be at a low level "0", and the second signal from the second output terminal B of the comparing unit 202 can also be at a low level "0". The comparison result in this case can then be "00". Based on the comparison result, the logic controller 300 can generate a third clock frequency adjustment signal. Based on the third clock frequency adjustment signal, the programmable clock unit 400 can reduce the frequency of the clock signal (Clock).

In other embodiments, the second MOS transistor M2 can have an aspect ratio smaller than the third MOS transistor M3, and the fourth MOS transistor M4 can have the same aspect ratio as the fifth MOS transistor M5. The drain current of the fourth MOS transistor M4 can equal to the drain current of the fifth MOS transistor M5. After mirroring, the second MOS transistor M2 can have a drain current lower than the third MOS transistor M3. In this manner, the comparison results from the comparing unit 202 can be the same as the above-described comparison results.

Thus, the current comparing unit 200 can include two decision nodes (or decision criteria), i.e., the first reference current I1 and the second reference current I2. Comparison between the measured current with the two decision nodes can result in more precise adjustment of the frequency of the clock signal, as compared with when the two decision nodes are not used. The frequency can then be stabilized within a predetermined range and the resultant output voltage of the charge pump 100 can be more accurate and stable.

In other embodiments, the current comparing unit 200 may further include a third comparing branch, a fourth comparing branch, or more comparing branches, and each of them can be similar to the first comparing branch (or the second comparing branch) shown in FIG. 4. Therefore, the current comparing unit 200 can include two or more decision nodes. By comparing with a plurality of decision nodes, frequency of the clock signal can be more precisely adjusted. Output voltage of the charge pump 100 can be significantly accurate and stable.

Further, in FIG. 4, the current flowing through the first diode D1 can be maintained within a small range, which can slow down aging of the first diode D1. The reliability and durability of the voltage regulator circuitry can be improved. On the other hand, because the current flowing through the first diode D1 is within a small range, the output voltage can be in a small range when there are changes in the operating temperature of the charge pump 100. The effect of temperatures on the output voltage of the circuit can be reduced.

Figure 6:
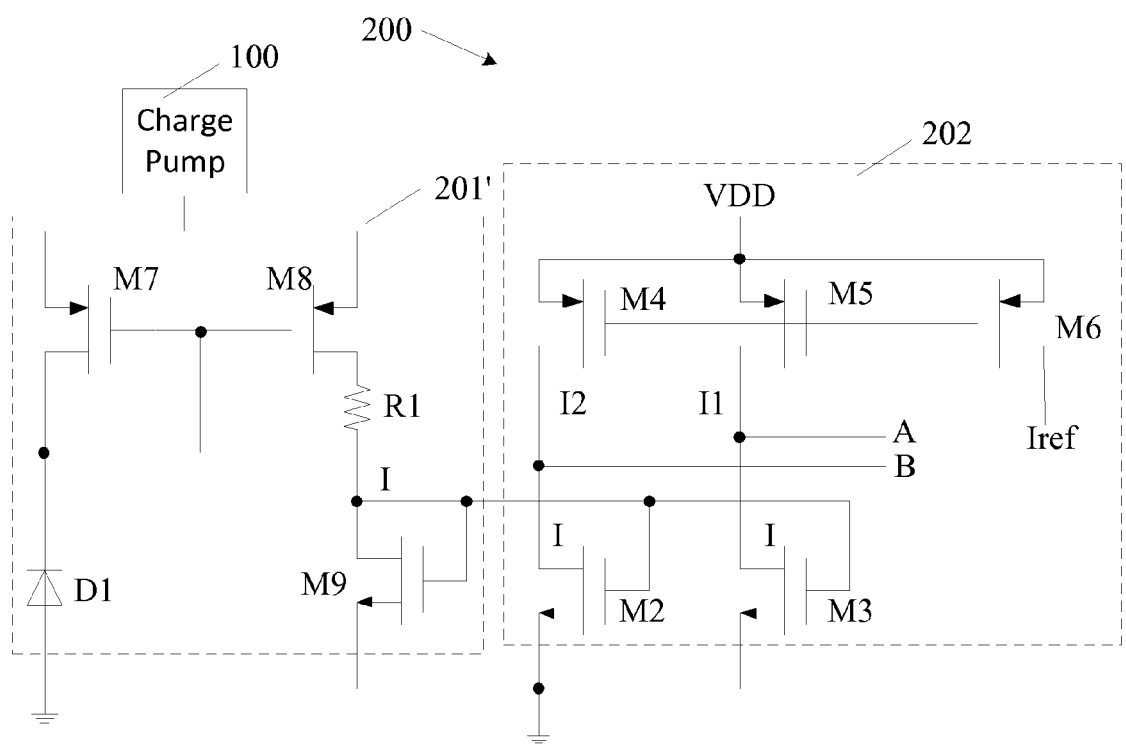
FIG. 6 depicts another exemplary current comparing unit in an exemplary voltage regulator device in accordance with various disclosed embodiments.

FIG. 6 depicts another exemplary current comparing unit in accordance with various disclosed embodiments. As shown in FIG. 6, the exemplary current comparing unit 200 can be configured similarly to the exemplary current comparing unit 200 depicted in FIG. 4. However, the differences between the exemplary current comparing unit 200 in FIG. 6 and the exemplary current comparing unit 200 in FIG. 4 include that the exemplary current comparing unit 200 in FIG. 6 has a current obtaining unit 201'.

As shown in FIG. 6, the current obtaining unit 201' can include a first diode D1, a seventh MOS transistor M7, an eighth MOS transistor M8, a ninth MOS transistor M9, and a first resistor R1.

The positive terminal of the first diode D1 can be electrically grounded and the negative terminal of the first diode D1 can be connected to a drain of the seventh MOS transistor M7. A gate and the drain of the seventh MOS transistor M7 can be connected together. A source of the seventh MOS transistor M7 can be connected to the output terminal of the charge pump 100. The source of the eighth MOS transistor M8 can be connected to the output terminal of the charge pump 100. A gate of the eighth MOS transistor M8 can be connected to the gate of the seventh MOS transistor M7. A drain of the eighth MOS transistor M8 can be connected to a first end of the first resistor R1. A second end of the first resistor R1 can be connected to a drain of the ninth MOS transistor M9.

The source of the ninth MOS transistor M9 can be electrically grounded. The gate and drain of the ninth MOS transistor M9 can be electrically connected together, which can also serve as an output terminal of the current obtaining unit 201'. In various embodiments, the type of each of the MOS transistors in the figures is not limited and can be changed. Connections among different types of MOS transistors may also be modified accordingly to achieve desired functionalities.

In a certain embodiment, the current obtaining unit 201 can include a p-diode and an NMOS. In various embodiments, the voltage regulator device includes a feedback circuit using two-point-judgment (e.g., using two current references) to regulate the output voltage.

Figure 7:
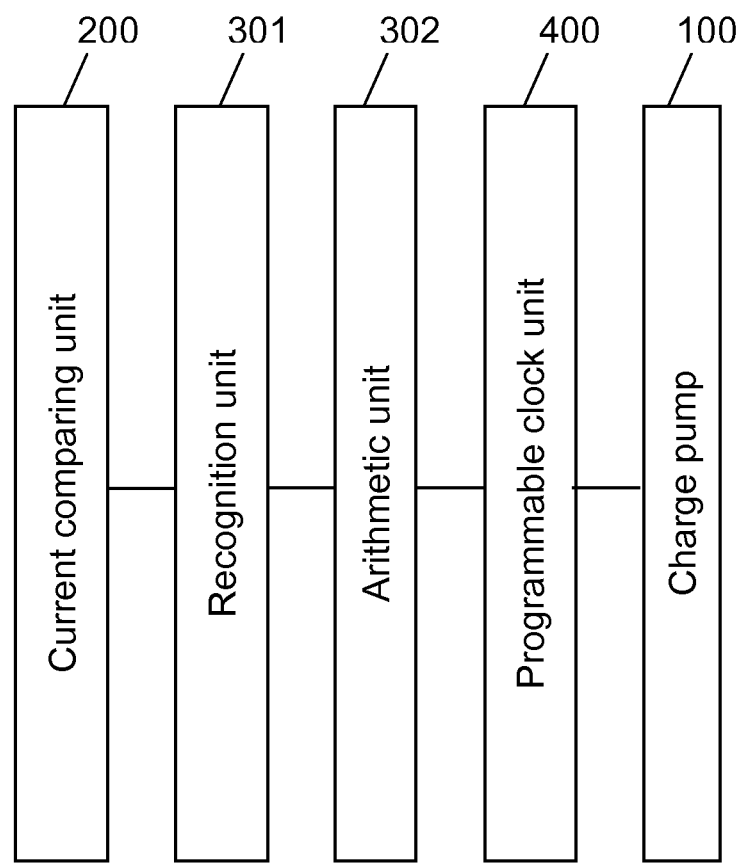
FIG. 7 depicts an exemplary logic controller in an exemplary voltage regulator device in accordance with various disclosed embodiments.

FIG. 7 illustrates an exemplary logic controller in the voltage regulator device. As shown in FIG. 7, the logic controller 300 may include a recognition unit 301 and an arithmetic unit 302. The recognition unit 301 is connected to current comparing unit 200 to receive a comparison result, the arithmetic unit 302 is connected to programmable clock unit 400 to provide a calculation result, and the programmable clock unit 400 is connected to charge pump 100.

The programmable clock unit 400 may generate a plurality of clock signals corresponding to the calculation result of the arithmetic unit 302. For example, a frequency of the clock signal corresponding to calculation result "0" can be f0; a frequency of the clock signal corresponding to calculation result "1" can be f0+Δf; and, likewise, a frequency of the clock signal corresponding to the calculation result "2" can be f0+2Δf . . . and so on.

The specific values of f0 and Δf can be set according to specific applications and/or empirical values, and are not limited in various embodiments. In general, the smaller the Δf, the more precisely the clock signal of the charge pump 100 can be adjusted, and the more accurate the output voltage of the charge pump 100 can be.

Still in FIG. 7, the recognition unit 301 can be connected to the current comparing unit 200 for recognizing the received comparison result, and for sending the recognition result to the arithmetic unit 302. The arithmetic unit 302 can be connected to the recognition unit 301 for generating a calculation result by operations of addition subtraction, and/or other arithmetic operations, based on the received recognition result.

The programmable clock unit 400 can be connected to the arithmetic unit 302 for receiving the calculation result and for outputting a corresponding clock signal based on the calculation result. The corresponding clock signal can then be sent to the charge pump 100.

For example, when the comparison result from the current comparing unit 200 is "11", the recognition unit 301 can send a recognition result to the arithmetic unit 302. The arithmetic unit 302 can execute an addition operation. When the comparison result from the current comparing unit 200 is "00", the arithmetic unit 302 can execute a subtraction operation according to the received recognition result. When the comparison result from the current comparing unit 200 is "01", the recognition unit 301 does not send a recognition result. The programmable clock unit 400 can maintain the output clock signal unchanged.

For example, assuming the current value of the arithmetic unit 302 is "3," at a first moment of time, the comparison result from the current comparing unit 200 is "11". The arithmetic unit 302 may execute an addition operation according to the recognition result and generate a calculation result "4". The calculation result "4" can be received by the programmable clock unit 400 for the programmable clock unit 400 to select and output a clock signal corresponding to the calculation result "4".

At a second moment of time, the current comparing unit 200 still outputs a comparison result "11". The arithmetic unit 302 can continue the addition operation and generate a calculation result "5". The calculation result "5" can be received by the programmable clock unit 400 for the programmable clock unit 400 to select and output a clock signal corresponding to the calculation result "5".

At a third moment of time, the comparison result from the current comparing unit 200 is "01". In this case, the recognition unit 301 will not send a recognition result to the arithmetic unit 302. The arithmetic unit 302 does not execute any operations of addition or subtraction. The programmable clock unit 400 can continue to output a clock signal corresponding to the calculation result "5".

At a fourth moment of time, the comparison result from the current comparing unit 200 is changed to "00". The arithmetic unit 302 can execute a subtraction operation based on the recognition result and generate a calculation result "4".

The programmable clock unit 400 can output a clock signal corresponding to the calculation result "4".

Thus, the programmable clock unit 400 can continuously select a corresponding clock signal and provide the corresponding clock signal to the charge pump 100.

That is, after making changes in the clock signal according to the calculation results from the arithmetic unit 302, the programmable clock unit 400 can output a clock signal with a stable frequency. The stable clock signal can be received by the charge pump 100, which can thus provide a stable output voltage.

As disclosed herein, a voltage regulator circuitry is provided. The voltage regulator circuitry may include a current comparing unit, a logic controller, and a programmable clock unit. In one embodiment, the voltage regulator circuitry including the current comparing unit, the logic controller, and the programmable clock unit may form a feedback loop to effectively reduce power consumption of the voltage regulator circuitry through this feedback loop. In addition, the frequency of the clock signal can be more precisely adjusted by a current comparing unit, e.g., by using various decision criteria to compare the detected current with at least two reference currents. The output voltage of the charge pump can be sufficiently accurate, thereby preventing instability of the output voltage.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A voltage regulator device, comprising:
a current comparing unit configured to convert an output voltage from a charge pump to a current and to compare the current with a first reference current and a second reference current, different from the first reference current, to generate a comparison result;
a logic controller connected to the current comparing unit and configured to generate a clock frequency adjustment signal based on the comparison result; and
a programmable clock unit connected to the logic controller to receive the clock frequency adjustment signal and connected to the charge pump, and configured to adjust a frequency of a clock signal according to the clock frequency adjustment signal and to send the clock signal to the charge pump to control the output voltage of the charge pump, wherein the logic controller includes a recognition unit and an arithmetic unit, and wherein
the recognition unit is electrically connected to the current comparing unit to recognize the comparison result and send a recognition result to the arithmetic unit; and
the arithmetic unit is electrically connected to the recognition unit and the programmable clock unit to execute an addition or subtraction operation according to the recognition result to generate a calculation result and send the calculation result to the programmable clock unit.

2. The device of claim 1, wherein the current comparing unit, the logic controller, and the programmable clock unit forms a feedback loop connected to the charge pump.

3. The device of claim 1, wherein the current comparing unit includes a current obtaining unit and a comparing unit.

4. The device of claim 1, wherein the logic controller is an adder or a subtractor and the programmable clock unit is configured to output the clock signal corresponding to the calculation result.

5. The device of claim 3, wherein the current obtaining unit is electrically connected to an output terminal of the charge pump and configured to detect the output voltage of the charge pump and to convert the output voltage to the current.

6. The device of claim 3, wherein the comparing unit includes a second MOS transistor, a third MOS transistor, a fourth MOS transistor, a fifth MOS transistor, and a sixth MOS transistor, and wherein
sources of the second MOS transistor and the third MOS transistor are electrically grounded;
gates of the second MOS transistor and the third MOS transistor are electrically connected to an output terminal of the current obtaining unit;
drains of the second MOS transistor and the fourth MOS transistor are electrically connected with one another;
drains of the third MOS transistor and the fifth MOS transistor are electrically connected with one another;
sources of the fourth MOS transistor, the fifth MOS transistor, and the sixth MOS transistor are electrically connected to a power supply, and gates of the fourth MOS transistor and the fifth MOS transistor are electrically connected to a gate of the sixth MOS transistor.

7. The device of claim 6, wherein the sixth MOS transistor has a drain configured to receive a reference current including: the first reference current including a drain current of the fifth MOS transistor, and the second reference current including a drain current of the fourth MOS transistor; wherein the drain of the fifth MOS transistor is a first output terminal of the comparing unit, the drain of the fourth MOS is a second output terminal of the comparing unit; and the first reference current is less than the second reference current.

8. The device of claim 6, wherein the fourth MOS transistor has an aspect ratio greater than the fifth MOS transistor and the second MOS transistor has a same aspect ratio as the third MOS transistor.

9. The device of claim 6, wherein the second MOS transistor has an aspect ratio smaller than the third MOS transistor, and the fourth MOS transistor has a same aspect ratio as the fifth MOS transistor.

10. The device of claim 3, wherein the current obtaining unit includes a first diode, and a first MOS transistor, and wherein the first diode includes a negative terminal electrically connected to the output terminal of the charge pump and a positive terminal electrically connected to a drain of the first MOS transistor.

11. The device of claim 10, wherein the first MOS transistor includes an electrically grounded source having a gate and a drain electrically connected with one another, and wherein the drain of the first MOS transistor is an output terminal of the current obtaining unit.

12. The device of claim 3, wherein the current obtaining unit includes a first diode, a seventh MOS transistor, an eighth MOS transistor, a ninth MOS transistor, and a first resistor, and wherein:
the first diode has a positive terminal electrically grounded and a negative terminal electrically connected to a drain of the seventh MOS transistor;
the seventh MOS transistor has a gate electrically connected with a drain thereof and a source electrically connected to the output terminal of the charge pump;
the eighth MOS transistor has a source electrically connected to the output terminal of the charge pump, a gate electrically connected to the gate of the seventh MOS transistor, and a drain electrically connected to a first end of the first resistor;
the first resistor has a second end electrically connected to a drain of the ninth MOS transistor; and
the ninth MOS transistor has an electrically grounded source, a gate, and a drain, wherein the gate and the drain electrically connected with one another as the output terminal of the current obtaining unit.

13. The device of claim 3, wherein the current obtaining unit includes a P-diode and an NMOS transistor.

14. A voltage regulating method, comprising:
converting an output voltage from a charge pump to a current;
comparing the current with a first reference current and a second reference current greater than the first reference current to generate a comparison result by a current comparing unit;
generating a clock frequency adjustment signal by a logic controller based on the comparison result from the current comparing unit; and
adjusting a frequency of a clock signal by a programmable clock unit according to the clock frequency adjustment signal, wherein the clock signal is sent to the charge pump, wherein the logic controller includes a recognition unit and an arithmetic unit, and wherein
the recognition unit recognizes the comparison result to generate a recognition result and sends the recognition result to the arithmetic unit; and the arithmetic unit performs an addition or subtraction operation according to the recognition result to generate a calculation result and send the calculation result to the programmable clock unit.

15. The method of claim 14, further comprising detecting the output voltage from the charge pump by the current comparing unit.

16. The method of claim 14, further including increasing the frequency of the clock signal by the programmable clock unit, when the current is less than the first reference current.

17. The method of claim 14, further including maintaining the frequency of the clock signal by the programmable clock unit, when the current is greater than or equal to the first reference current and is less than or equal to the second reference current.

18. The method of claim 14, further including reducing the frequency of the clock signal by the programmable clock unit, when the current is greater than the second reference current.

* * * * *